United States Patent
McIntosh

Patent Number: 6,100,655
Date of Patent: Aug. 8, 2000

[54] MECHANICAL RETURN FAIL-SAFE ACTUATOR FOR DAMPER, VALVE, ELEVATOR OR OTHER POSITIONING DEVICE

[76] Inventor: Douglas S. McIntosh, 8 Savages Close, Bishops Tachbrooke, Warwickshire, CV33 9RL, United Kingdom

[21] Appl. No.: 09/252,558

[22] Filed: Feb. 19, 1999

[51] Int. Cl.[7] ..................................... A02K 7/10
[52] U.S. Cl. ................ 318/159; 318/478; 318/160; 318/563; 307/66; 307/117; 364/184
[58] Field of Search .................. 318/478, 160, 318/563, 159; 307/66, 117; 364/184

[56] References Cited

U.S. PATENT DOCUMENTS

| | | | |
|---|---|---|---|
| 4,129,811 | 12/1978 | Pearson | 318/478 |
| 4,353,271 | 10/1982 | Pieczulewski | 318/478 |
| 4,613,798 | 9/1986 | Baumann | 318/160 |
| 4,637,296 | 1/1987 | Hirosaki et al. | 98/1 |
| 4,677,355 | 6/1987 | Baumann | 318/160 |
| 5,144,153 | 9/1992 | Scheppmann, II | 307/66 |
| 5,249,858 | 10/1993 | Nusser | 318/478 |
| 5,422,808 | 6/1995 | Catanese, Jr. et al. | 364/184 |
| 5,525,963 | 6/1996 | Purssey | 340/540 |
| 5,576,581 | 11/1996 | Iannuzzi et al. | 307/117 |
| 5,744,876 | 4/1998 | Fangio | 307/66 |
| 5,744,923 | 4/1998 | Strauss et al. | 318/563 |

FOREIGN PATENT DOCUMENTS

| | | |
|---|---|---|
| 467591 | 11/1975 | Australia . |
| 686557 | 5/1964 | Canada . |
| 1087680 | 10/1980 | Canada . |
| 2007427 | 1/1990 | Canada . |
| 2039884 | 4/1991 | Canada . |
| 2138655 | 4/1993 | Canada . |
| 2136346 | 5/1993 | Canada . |
| 2146413 | 4/1995 | Canada . |
| 2155466 | 8/1995 | Canada . |

*Primary Examiner*—Karen Masih
*Attorney, Agent, or Firm*—Francis C. Hand; Carella, Byrne, Bain, Gilfillan, Cecchi, Stewart & Olstein

[57] ABSTRACT

The electrically powered actuator includes a capacitor for supplying supplemental electrical power to a motor in response to a loss of power to the motor from a main power source in order to enable the motor to overcome the magnetic resistance of the motor and a frictional resistance of a gear train in order to bias a positioning device into a retracted fail-safe position. The supplemental electrical power supplied to the motor supplements the biasing force of a spring or the like for biasing the positioning device from an extended position into the retracted fail-safe position. The capacitor is connected to the electrical circuit of the motor so as to be charged during normal operation of the motor and for delivering a pulse of reverse polarity power to the motor in response to a loss of power to the motor from the main source of power.

13 Claims, 3 Drawing Sheets

MECHANICAL RETURN FAIL-SAFE ACTUATOR FOR DAMPER, VALVE, ELEVATOR OR OTHER POSITIONING DEVICE

BACKGROUND OF THE INVENTION

The present invention relates to a fail safe electrically powered actuator for a damper, valve, elevator or other positioning device, and more particularly to a mechanical return which combines with an electrical motor to fail safe proper positioning of the device when normal power conditions have failed.

Heating and/or cooling control valves and dampers are currently positioned using pneumatic, electric or electronic actuators. Pneumatic actuators inherently adopt a fail safe position, and many electronic and electric actuators are designed to take a fail-safe position should electrical power be lost or switched off. In electric/electronic actuators the methods of accomplishing this include springs, capacitors, gravity (weights) or batteries with adequate power to return the valve or damper to that normal position on loss of electrical power for whatever reason. In pneumatically controlled systems, a spring is inherent and simple, but in electronic actuators with a spring, extra power is required both to do the work and to spring the gear motor through its gear train (see e.g. Canadian Patent No. 686,557 of Enghold, issued May 12, 1964), or use a clutch (see e.g. laid-open Canadian Patent Application No. 2,155,466 of Birchmeier) or time delays result while a capacitor or battery recharges. In general such systems create additional complexity and extra costs. In smaller actuators, free running hysterysis type motors with gear trains are able to be sprung back through their travel and gearing to spring shut by a carefully sized and selected spring. But in larger actuators, more powerful motors and specifically DC motors, synchronous motors, or motors which have inherent friction, magnetic "locking" and/or resistance and friction of brushes or commutators, etc., all add up as resistance to springing backwards to the safe position. The gearing and motor friction is such that the spring cannot return these actuators and/or alternatively they slam shut against the end stop, thus breaking the gearing or linkage mechanism. In other variations, clutches have been incorporated, but the force of the return spring can be so great as to constitute a danger, or to cause water hammer in valved applications. To solve this problem, miniature hydraulic pistons, weighted speed governors, brakes, or other speed controllers have been added at further increased complexity and cost just to control slamming or excessive speed.

Canadian Patent No. 686,557 of Engholdt issued May 12, 1964 teaches a valve system in which the valve is kept open by an electrically operated motor during normal power conditions, but a spring closes the valve when power to the motor is interrupted. Reduction gearing is provided between the motor and actuating mechanism for the valve to enable a motor of relatively small size to be utilized to actuate the valve. The motor, of free-wheeling type, is forced backwards by the spring as it closes the valve.

Baumann U.S. Pat. Nos. 4,613,798 issued Sep. 23, 1986 and 4,677,355 issued Jun. 30, 1987, laid-open Canadian application Serial No. 2,155,466 of Birchmeier published Feb. 18, 1996 and Australian Patent No. 467,591 of Carroll as well as Canadian Patent No. 1,087,680 of Waltham issued Oct. 14, 1980 teach electric motor controlled positioning devices, the positioning devices being returned to safety position under urging of a spring if there is a power failure whereupon the motor free-wheels back through its gearing.

Teaching capacitive power backup to drive an actuator motor to a fail-safe location of a positioning device are U.S. Pat. Nos. 5,744,876 of Fangio issued Apr. 28, 1998, 5,744,923 of Strauss et al issued Apr. 28, 1988 and 5,278,454 of Strauss et al issued May 23, 1995 (upon re-examination), as well as Canadian applications Serial Nos. 2,146,413 of Jatnieks, published Oct. 7, 1995 and 2,138,655 of Strauss et al published Jan. 6, 1994. Laid-open Canadian applications Nos. 2,007,427 of Brown et al published Jul. 23, 1990 and 2,039,884 of Shah published Oct. 6, 1992 teach the use of capacitive power to change the direction of a motor.

Of general background interest teaching general types of fail-safe devices for positioning components are U.S. Pat. Nos. 4,129,811 of Pearson issued Dec. 12, 1998 (emergency door opening device), and 4,637,296 of Hirosaki et al issued Jan. 20, 1987, and 5,422,808 of Cantanese, Jr. et al issued Jun. 6, 1995, and laid-open Canadian patent application Serial No. 2,136,346 of Hyppio et al published Dec. 9, 1993, 5,144,153 of Scheppmann issued Sep. 1, 1992 (motorized gate control upon power failure) and 5,576,581 of Iannuzzi et al issued Nov. 19, 1996 (door control system).

These references teach relatively complicated mechanical and electro-mechanical solutions for positioning dampers, valves and the like during power interruptions. It is an object of the present invention to provide a relatively simple, economical and effective spring-return type of fail-safe electrically powered actuator for a positioning device.

SUMMARY OF THE INVENTION

Briefly, the invention is directed to an electrically powered actuator for a positioning device, such as a damper, a valve, an elevator or the like, The electrically powered actuator includes a gear train, an electric motor for connection to a source of power for driving the gear train, a positioning device connected to the gear train for movement from a retracted fail-safe position to an extended position in response to normal operation of the motor and a biasing means for biasing the positioning device from the extended position to the retracted position.

In accordance with the invention, a means is provided for supplying a supplementary source of electrical power to the motor when normal power to the electric motor is interrupted in order to complement the biasing force of the biasing means to overcome the magnetic resistance of the motor and the friction resistance of the gear train.

In a preferred embodiment, the electric motor is a DC motor and the means for supplying the supplemental electrical power is a small capacitor which is electrically connected to the motor for charging thereof during normal operation of the motor and for delivering a pulse of reverse polarity power to the motor in response to the loss of power from the source of power. The amount of reverse polarity supplied by the capacitor is controlled in order to enable the motor and gear train to act as a brake thereby controlling the speed of return of the positioning device to the fail-safe position.

BRIEF DESCRIPTION OF THE DRAWINGS

These and other advantages of the invention will become apparent upon reading the following detailed description and upon referring to the drawings in which.

Figure 1:
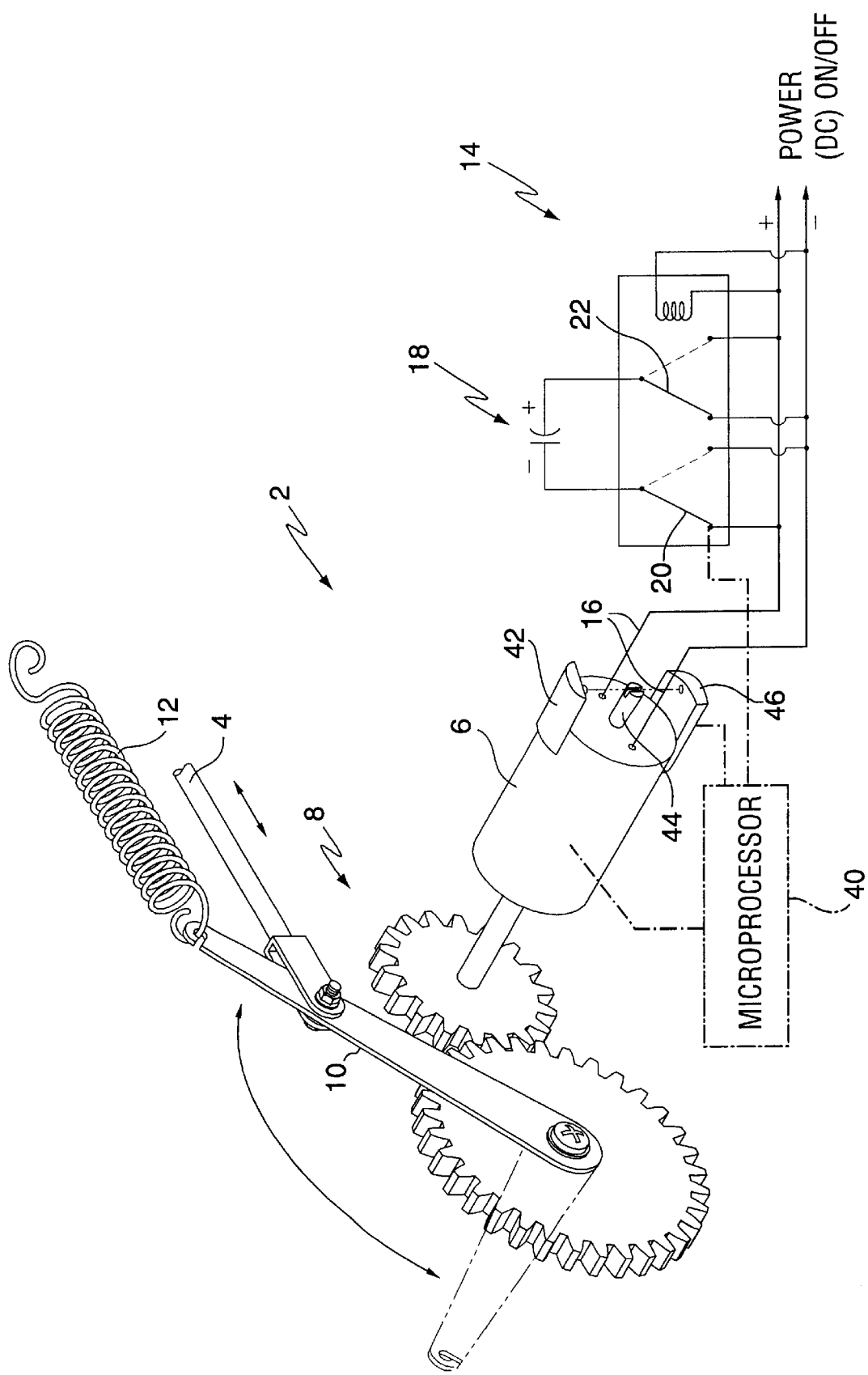
FIG. 1 is a schematic perspective view of a spring biased actuator according to the present invention.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

The present invention had its inception in tests which were performed and proved that an electric gear motor with return spring would not return to fail-safe position when the motor is without electrical power, because of the motor magnets, friction, etc. Yet in these tests, if only 1.5 volts were applied (8% of a 12 volt DC motor or 2% of the watts), then the return spring drive the load to fail-safe position, the gear motor then being moved forcefully by stronger mechanical forces.

Turning to FIG. 1, there is illustrated a fail-safe electrically powered actuator 2, for a damper, valve elevator or other positioning device (not illustrated) the position of which is governed by the location of bar 4. Actuator 2 comprises an electrical motor 6 which is powered by DC or alternatively full or half wave rectified AC. Motor 6 drives gear train 8 to move output crank arm 10 from its retracted or normal position as illustrated, to its driven (extended) position (shown in phantom) against the bias of spring 12. A relay 14 is provided across lines 16, going to a main power source (not illustrated) for motor 6. Capacitor 18 is associated with relay 14, through contacts 20 and 22. Those contacts are normally open (shown in phantom). When relay 14 is energized during normal power conditions, contacts 20 and 22 are closed (as illustrated), thereby charging capacitor 18.

On loss of power from the main power source, on lines 16, spring 12, which is fully stretched (with crank arm in its phantom position), attempts to return crank arm 10 and hence gears 8 and motor 6 to their normal position. The magnetic locking of motor 6 and friction in gear train 8 prevent this from happening. Upon loss of normal power however, relay contacts 20 and 22 return to their normal, open position (phantom), reversing polarity across motor 6, counteracting magnetic resistance and enabling the force of spring 12 to overcome the magnetic and frictional resistance previously encountered, to move crank arm 10 to its retracted, fail-safe (normal) position as illustrated.

As will be discussed in more detail subsequently, relay 14 may be replaced with a micro-processor based controller with a speed sensor, wired to use controlled bursts of power from its rectifying capacitor to limit the return speed of the motor to so control slamming. Capacitor 18 is of a size sufficient to supply a pulse of just enough reverse polarity power, following the loss of normal power, to free up motor 6 and gears 8 from magnetic and frictional restriction, thus allowing the motor and gears to slip backwards under the force of spring 12. Thus the motor and gears are used as a brake to control the speed on the return stroke of arm 10.

Actuator 2 remains basically a spring or mechanically returned device. The amount of friction of gears 8 and magnetic resistance of motor 6 to spin freely is controlled by a small capacitor 18 which is later recharged during the running cycle. In this embodiment of the present invention, the magnetic locking and friction from the motor and gears now actually perform a benefit in that, through careful regulation of the power from the capacitor during a power failure, the gear and motor assembly is permitted to act as a brake without power, or with full power for quick return. On mid power, motor 6 and gears 8 partially hold both the load and spring 12 with controlled slipping, always assuming the ratio of friction and slipping force is carefully selected during design. It is preferred that the forces be carefully selected during design of such actuators so that the actuators do not spring back when de-energized until a minimal charge from the capacitor promotes the motor to run in the return direction with just enough power to allow some slipping, but limiting the force of spring 12 so as to prevent slamming. In other words, the return capacitor is sized to supply just enough power to free up the magnetic locking of the motor and the friction of the gearing so as to allow the motor to spring backwards at controlled speed. This can be as little as 2 to 5% of the power of the spring.

Figure 2:
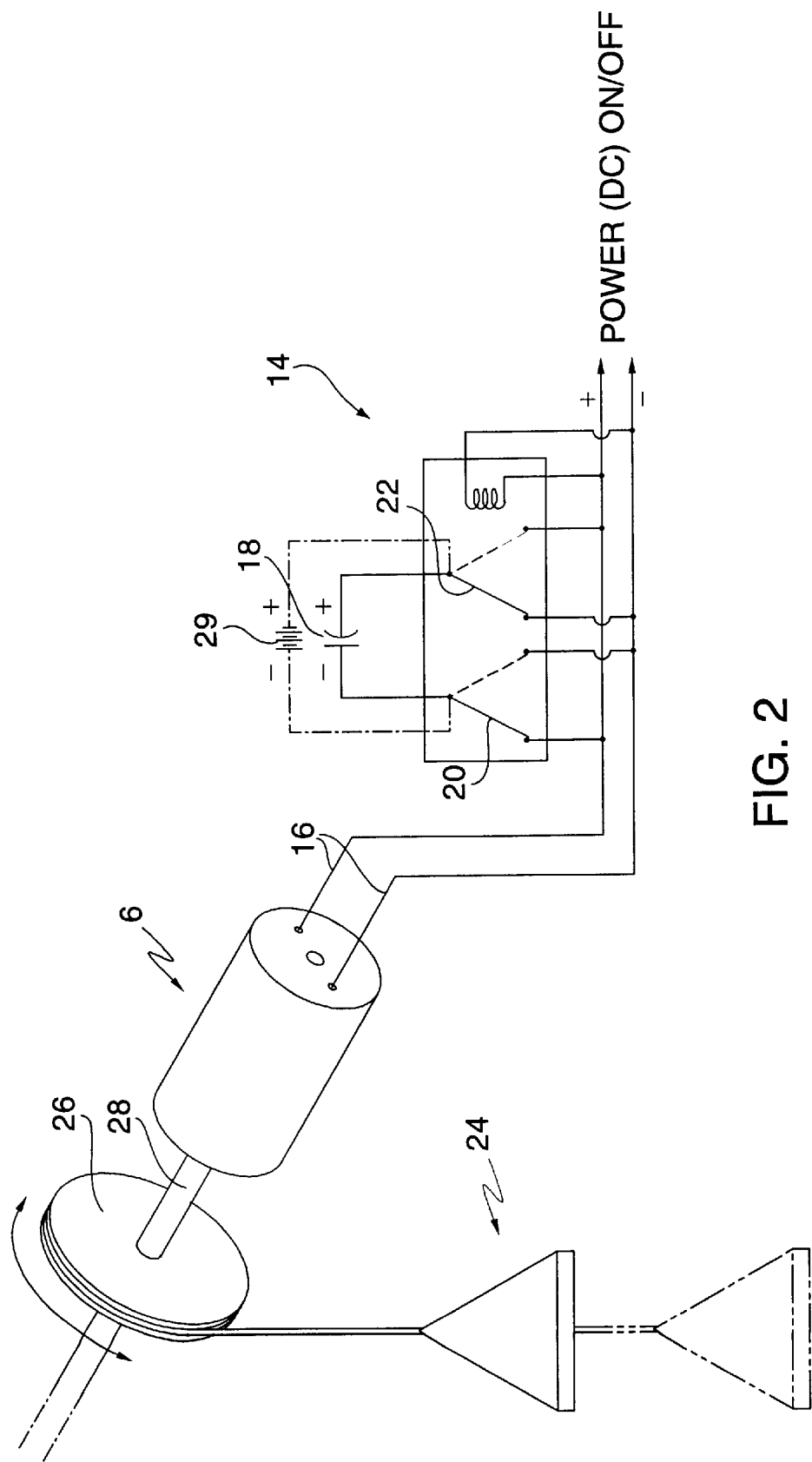
FIG. 2 is a schematic perspective view of a weight biased, alternative embodiment of actuator according to the present invention.

In the alternative embodiment of the invention illustrated in FIG. 2, a similar construction to that of FIG. 1 is illustrated with the exception that, instead of gears 8, lever arm 10 and spring 12, the return force for motor 6 to position the positioning device 24 (in this case an elevator) in its fail-safe (retracted) position during interruption of normal power is provided by a weight of the elevator which is suspended from a motor driven spool 26, spool 26 being secured on rotating spindle 28 which extends to and positions the elevator, e.g. by returning it to ground level under controlled speed. As well, instead of capacitor 18, a battery 29 (phantom) may be used as the supplementary power source. This battery may be arranged so as to be rechargeable during normal power conditions. As shown, the battery 29 is connected in parallel with the capacitor 18.

Figure 3:
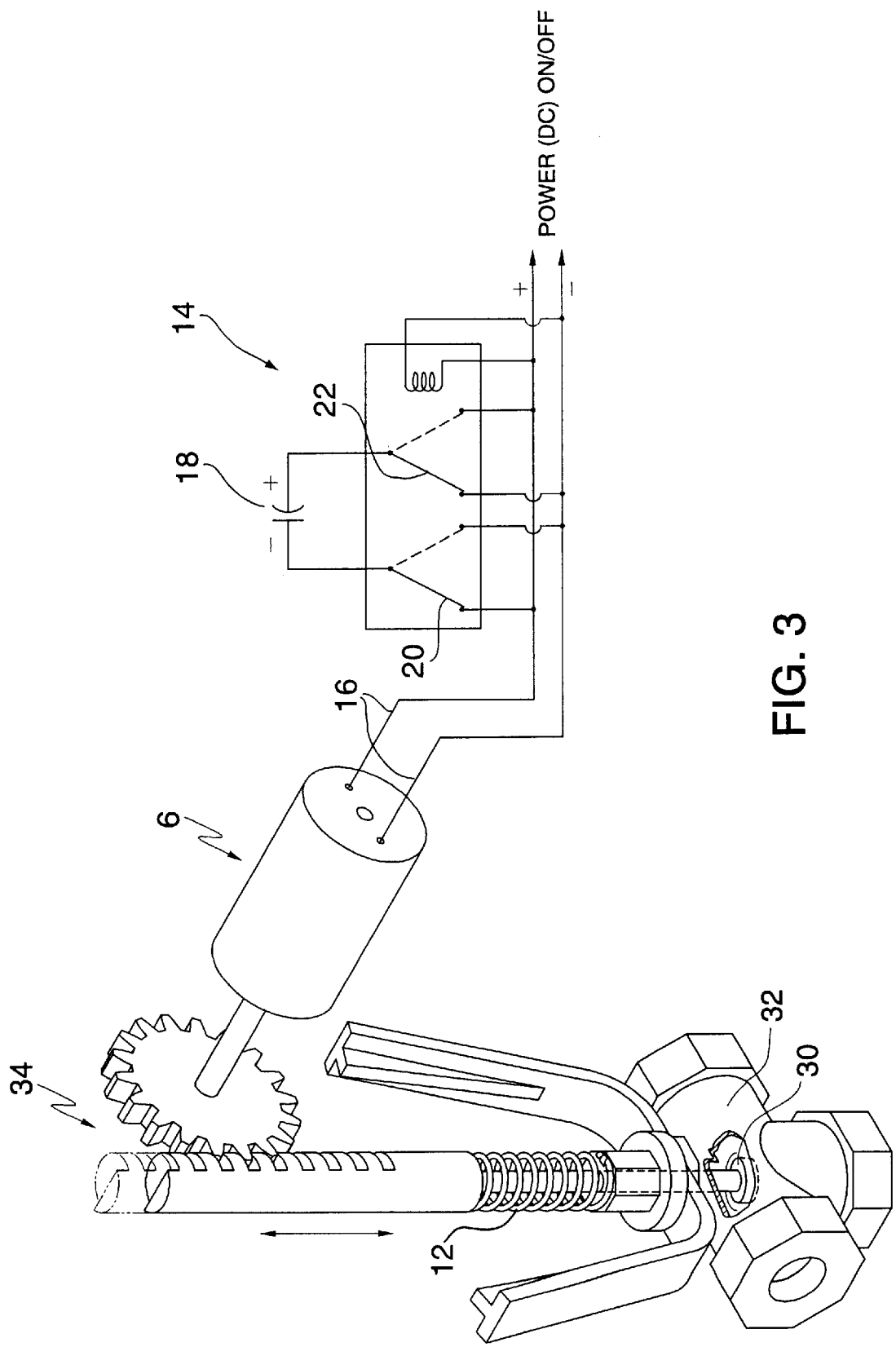
FIG. 3 is a schematic perspective view of a further embodiment of a spring biased actuator according to the present invention for positioning a valve within a pipe.

FIG. 3 illustrates an application of the present invention to position a valve 30 in pipe 32. In this embodiment, motor 6 drives rack and pinion system 34 which vertically positions globe valve 30 against a return compression spring 12 within pipe 32. Again actuator 2 operates otherwise in a manner similar to that of FIG. 1, with the force of motor 6 acting on rack and pinion 34 being sufficient to overcome the bias of spring 12, to lower valve disc 30 into operating position under normal power conditions to the motor, but the force of spring 12 is however sufficient, with the help of the reverse polarity power from capacitor 18, to overcome the magnetic and frictional forces of motor 6 and gear 8, when normal power is interrupted. In this fail-safe position, valve 30 is in raised (phantom) position in the illustrated embodiment.

As previously indicated, and as illustrated in FIG. 1 in phantom, a microprocessor 40 is often incorporated as illustrated to control and modulate actuator 2 to exact position or exact speed during both normal and interrupted power operations. As illustrated again in phantom in FIG. 1, this may be achieved through a light source, e.g. led 42, target 44 rotating with the armature of motor 6 and light receiver 46, the light sensor passing signals to microprocessor 40. Since the micro-processor circuit usually incorporates a rectifier circuit with capacitor, the residual power in the capacitor may be utilized during power failure to return the gear 8 and motor 6 safely and reliably with the spring 12 doing the actual load. It is because of the power contained in spring 12 that a very small capacitor 18 or battery 38 is required to move the load, it being only enough to partially power the motor 6 and gears 8 at controlled speed. The spring 12 does the main work with the capacitor/battery controlling that force. On re-powering the unit, the motor 6/gears 8 assemble immediately yet the capacitor, being so small, is charged by or before the end of the first actuator stroke, ready for the next power failure to control the return speed of the actuator (being again returned by its spring).

TEST DATA

The following report on testing which has been done on an actuator arranged in accordance with the present invention will serve to better explain the invention.

Initial tests were done on prototype control valves using a 12 volt motor and suitable gear train. A return spring supplied 8 to 10 lbs of linear return force, which the motor, through the gear train, could overcome with force to spare for the close off pressure.

The motor was mechanically disconnected from its valve and voltage was applied to ascertain at what point the voltage overcame the magnetic lock-up of the motor and gear train, with no load. It was found that at approximately 2.1 volts the motor and gear train would start, but this would not occur at less than two volts. It was also noted that once started and the voltage subsequently reduced to approximately 1.4 volts, the motor and gear train would continue to run still without load.

The motor was then reconnected to the valve and its return spring and the valve was run to its fully driven position with 10 volts of DC current. When power was applied to the motor in reverse polarity at 1 volt DC, it would not start the motor on its return stroke. At about 1.8 volts, the biasing of a spring took over and the return cycle started aggressively. Voltage had to be reduced to prevent runaway of the motor and gears. It was found that a between about 1.4 and 1.8 volts, the speed of the motor on its spring-powered return could be limited to prevent excessive speed.

This simple test proves that the voltage applied to the motor to achieve return of a valve is less than the unloaded, start-up voltage of the motor. The fact that the motor gains speed establishes that the electrical power used is in fact less than the power required to just start the motor on its own and that the spring is doing the external work with power left over to partially return the motor and gear train.

The best motors for this invention are DC motors. However reversible synchronous or AC motors can be used provided a suitable oscillating circuit is provided to generate alternating current from the DC battery/capacitor.

The present invention may be applied to either modulating (proportional acting) or two position (open/close.up/down etc.) positioning devices.

Thus there has been provided in accordance with the invention a mechanical return fail-safe for damper valve, elevator or other position device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. An electrically powered actuator comprising
   a gear train;
   an electric motor for connection to a source of power for driving said gear train,
   a positioning device connected to said gear train for movement from a fail-safe position to an operative position in response to normal operation of said motor;
   biasing means for biasing said positioning device from said operative position to said fail-safe position; and
   means for supplying a supplemental electrical power to said motor in response to a loss of power from the source of power to enable said biasing means to overcome a magnetic resistance of said motor and a frictional resistance of said gear train to bias said positioning device into said fail-safe position.

2. An electrically powered actuator as set forth in claim 1 wherein said positioning device is a pivotally mounted cranked arm.

3. An electrically powered actuator as set forth in claim 1 wherein said means for supplying a supplemental electrical power is a capacitor electrically connected to said motor for charging thereof during normal operation of said motor and for delivering a pulse of reverse polarity power to said motor in response to a loss of power from the source of power.

4. An actuator as set forth in claim 3 which further comprises a pair of lines for delivering power from the power source to said motor and a relay having a pair of normally open relay contacts electrically connecting said capacitor to said lines.

5. An actuator as set forth in claim 4 which further comprises a microprocessor connected to said motor and said relay to control and modulate the operation of said motor during normal operation and interrupted power operation.

6. An actuator as set forth in claim 1 wherein said biasing means is a spring.

7. In combination
   a positioning device for movement from a fail-safe position to an operative position;
   an electric motor for connection to a source of power for moving said positioning device to said position; and
   a capacitor electrically connected to said motor for charging thereof during normal operation of said motor and for delivering a pulse of reverse polarity power to said motor in response to a loss of power from the source of power to enable said motor to act as a brake on said positioning device to control the return of said positioning device to said fail-safe position.

8. The combination as set forth in claim 7 which further comprises a battery connected in parallel with said capacitor to deliver supplemental power to said motor in response to a loss of power from the source of power.

9. In combination,
   a positioning device for movement from a fail-safe position to an operative position;
   an electric motor for connection to a source of power for moving said positioning device to said operative position;
   a spring biasing said positioning device from said operative position to said fail-safe position; and
   a capacitor electrically connected to said motor for charging thereof during normal operation of said motor and for delivering a pulse of reverse polarity power to said motor in response to a loss of power from the source of power to enable said spring to overcome a magnetic resistance of said motor to bias said positioning device to said fail-safe position.

10. The combination as set forth in claim 9 which further comprises a gear train between said motor and said positioning device and wherein said pulse of reverse polarity is sufficient to overcome a frictional resistance of said gear train.

11. The combination as set forth in claim 10 wherein said positioning device is a crank arm.

12. The combination as set forth in claim 9 which further comprises a rack and pinion system between said motor and said positioning device and wherein said pulse of reverse polarity is sufficient to overcome a frictional resistance of said rack and pinion system.

13. The combination as set forth in claim 12 wherein said positioning device is a globe valve.

\* \* \* \* \*